Oct. 11, 1932.   C. McC. WELLONS   1,882,203
CRANK
Filed July 20, 1928   2 Sheets-Sheet 1

Charles McC. Wellons,
INVENTOR.
BY
ATTORNEYS.

Oct. 11, 1932.   C. McC. WELLONS   1,882,203
CRANK
Filed July 20, 1928   2 Sheets-Sheet 2

Charles McC. Wellons,
INVENTOR.
BY Ralph Vanetta
Paul Purchard
ATTORNEYS.

Patented Oct. 11, 1932

1,882,203

UNITED STATES PATENT OFFICE

CHARLES McC. WELLONS, OF BELLEVUE, PENNSYLVANIA

CRANK

Application filed July 20, 1928. Serial No. 294,117.

This invention relates to cranks for connecting rods and more especially to flexible sliding cranks to be used for driving stern-wheel boats, in particular.

One of the primary objects of this invention is to provide a flexible crank capable of taking care of the momentary or permanent variations in the distance between the centers of the crank-pins of a driving and a driven shaft, said variations being due to various causes, such as, for instance, deflections in the supporting frame or in the shafts, relative angular displacement of cranks due to torsion in the shafts, or improper setting of said cranks on their respective shafts, and so forth. Another object of this invention is to reduce the strains and excessive bearing pressures due to more or less pronounced misalignments between a driving and a driven shaft or their respective crank-pins. A further object of this invention is the provision of a flexible crank which is simple in construction, efficient and adapted to be installed on old boats as well as new ones without necessitating great departures from the normal, simple, steam-boat construction. Additional features and advantages of this invention will appear from the following description considered in connection with the accompanying drawings forming a part of this application, and in which:

Figure 2:
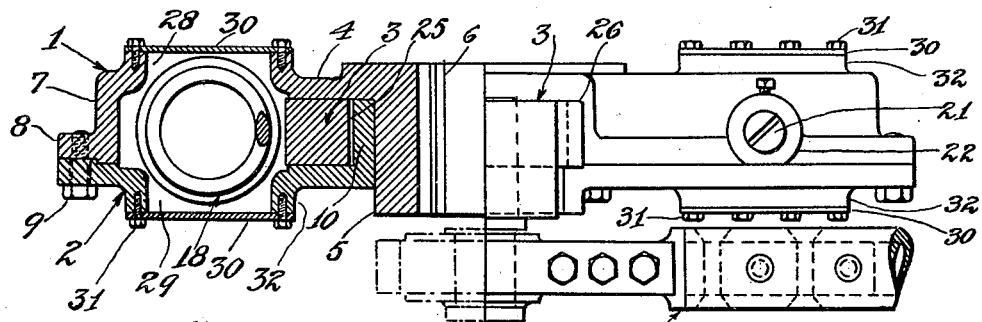
Fig. 2 is a top plan view of Fig. 1, one half of the figure showing a section taken on line 2—2 in Fig. 1.
Figure 1:
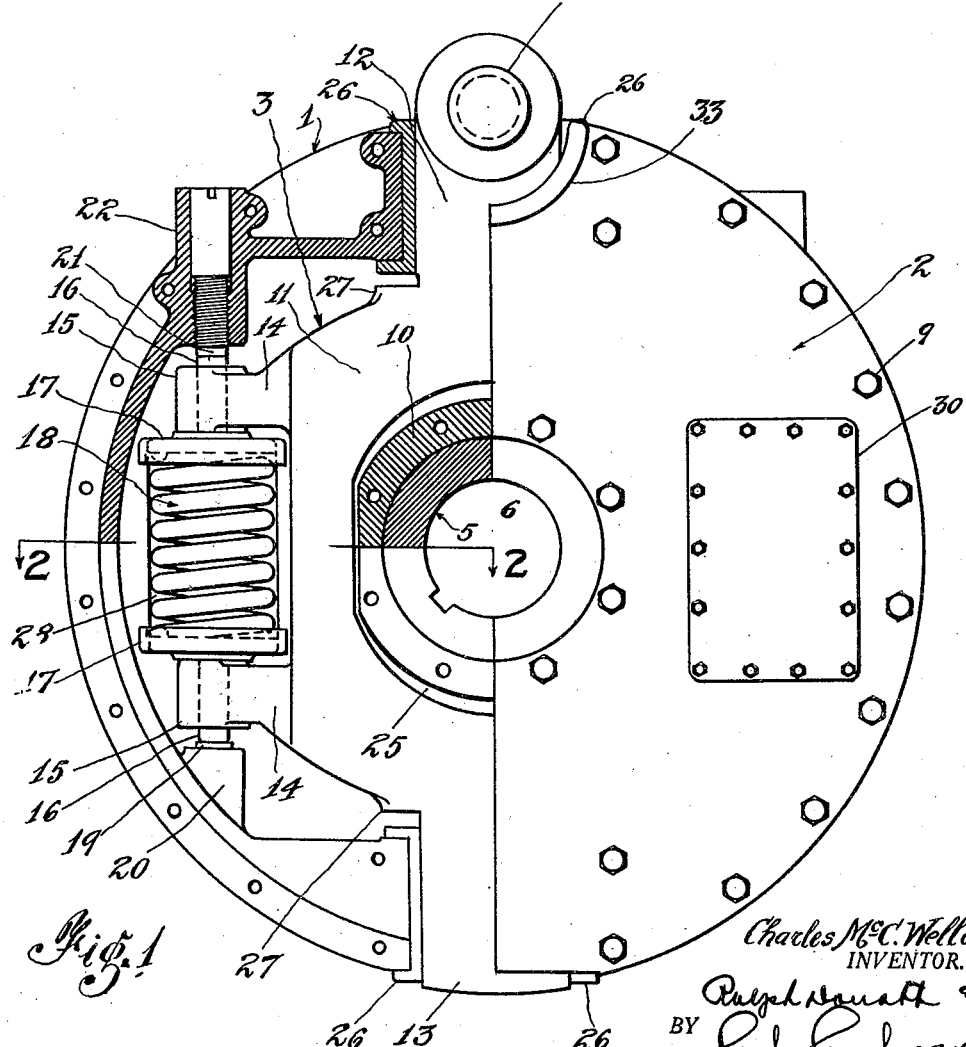
Fig. 1 is a front elevation with one half of the cover omitted and partly in section, of a sliding, flexible, crank built acording to my invention.

Reference being had to Figs. 1 an 2, a crank built according to this invention comprises three major parts, namely, the case 1, the cover 2 and the sliding crank 3.

The case consists of a circular web portion 4 having at the center a hub 5 suitably bored, as at 6, to fit on a drive shaft to which it is keyed or otherwise secured. The web portion has at its periphery a wall 7 provided with an outwardly directed flange 8 to which the cover 2 is secured by means of numerous bolts 9.

The cover has an inwardly directed sleeve 10 which closely fits over the case-hub 5 to produce a leak proof arrangement.

Intermediate the case and the cover is slidably mounted the sliding crank 3 consisting of a flat body portion 11, the crank arm 12 and the oppositely disposed guide arm 13. At each side of the body portion, and integrally therewith, are disposed in aligned and spaced relation the brackets 14 having enlarged ends or bushings 15 which are suitably apertured to receive freely the stems 16 of the spring-cups 17 for the coil springs 18. The latter are inserted between the cups under compression suited to the power to be transmitted by the crank, and their tendency is to force the cups outwardly against their corresponding brackets.

These springs are compressed beyond the initial compression only when the load applied along the axis of the crank is in excess of that normally required for the transmission of power and due to misalignment of the mechanism.

On the crank arm 12, is mounted the crank pin 23 to which is connected one end of the connecting rod, or pitman, 24.

The stem of the lower spring cup bears upon an abutment 19 mounted on a boss 20 formed in the wall of the case, and the shank of the upper spring cup contacts with the adjustable and threaded stop pin 21 screwed into a bushing 22 cast integrally with the case.

In the center of the body portion of the sliding crank is provided an aperture 25 of sufficient size to clear the sleeve 10 and to allow the desired amount of sliding movement of the crank in the direction of the crank and guide arms. Said arms are preferably guided for sliding movement between flanged liners 26 made of brass or any other suitable antifriction metal, and the total amount of travel of the crank is determined by the distance between one end of said liners and the stop bosses 27 provided on the body portion 11.

To reduce the width of the assembled crank, room for the rather large coil springs 18 is obtained by providing in the case and cover the openings 28 and 29 respectively. These openings are closed by means of tightly fitted cover-plates 30 made of steel plate and secured by bolts 31. The case cover is suitably reinforced around its various openings by ribs 32 and 33, as well as by the sleeve 10.

It will be noted from Fig. 1 that the coil springs are always compressed, whether the sliding crank 3 moves up or down.

Figure 5:
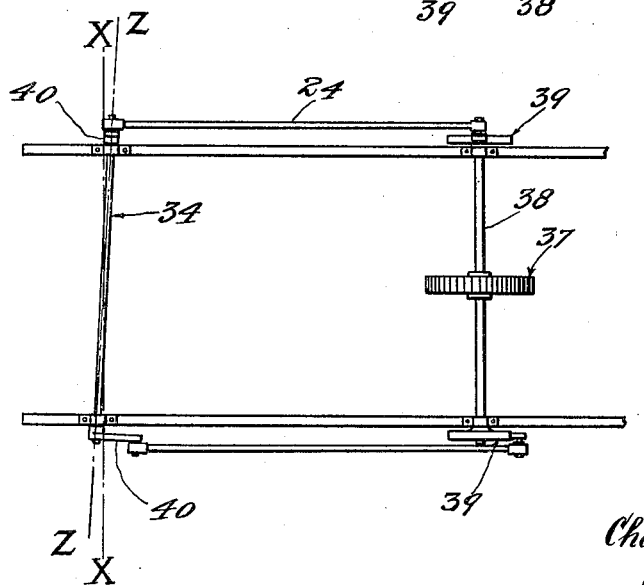
Fig. 5 is a diagrammatic view showing an extreme condition of misalignment of the stern-wheel shaft, which can be readily taken care of by a sliding flexible crank.

Assuming for instance that, for any reason, the shaft 34 of the stern-wheel 35 of a boat has been forced out of its normal position represented by the line X—X in Fig. 5 into the position Z—Z, it will be apparent that the distance between crank pins at the upper end of Fig. 5 has been reduced and that at the other end this distance has been increased. Therefore, in the case of a rigid crank construction, the upper pitman would be subject to excessive compression and the lower pitman to excessive tension. These undue strains would, of course, create abnormal pressures in the bearing of the shafts and of the crank pin, and perhaps cause the breakage of some part. These strains are maximum when the pitman connections are in the dead center position and minimum when the cranks are at 90 degrees therefrom, because any variation in the distance between centers of the crank pins is then taken care of by one crank assuming a position slightly out of parallel with the other crank.

It will be readily understood that when a crank of my invention is used in each pitman connection, all the variations in the distance between the centers of the crank pins will be compensated by the movements of the sliding crank against the compression springs 18. This movement is greatest on dead centers and nil when both cranks are in substantially parallel vertical position, in which position the sliding crank functions very much like a rigid one.

A valuable feature of this invention, as demonstrated by tests, is that the additional compression imparted to the coil springs 18 or their return into normal state of compression proceeds without jerks, and is very gradual. Moreover, the power required to additionally compress said springs is not wasted but is regained (disregarding frictional losses) because, when the springs of a crank on one side of the boat return to normal position, said power is transmitted by the pitman and the drive shaft to the pitman connection on the other side of the boat; it being assumed that the cranks on one side of the boat be disposed at right angles to the cranks on the other side, as is the usual construction.

A sliding crank of this type will operate in the manner just described under all kinds of conditions of misalignment, momentary or permanent, whether due to shocks, deflection of the wheel-beam or pitmen, angular displacement of the cranks due to distortion in shafts or to improper setting of the cranks, and so forth.

Figure 4:
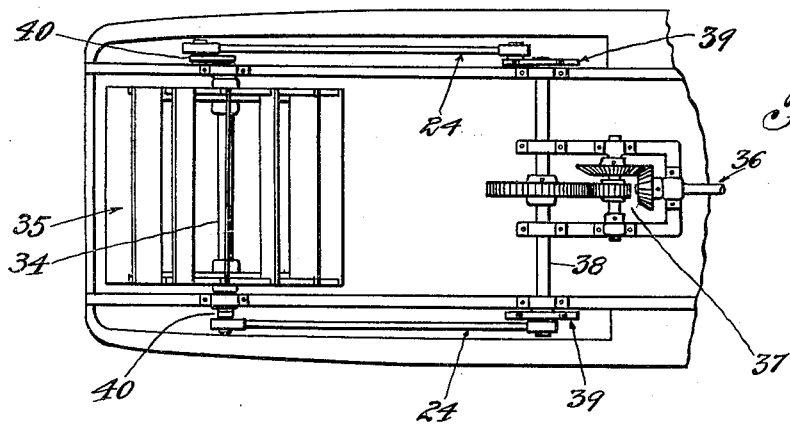
Fig. 4 is a top plan view of Fig. 3, the superstructure having been omitted.
Figure 3:
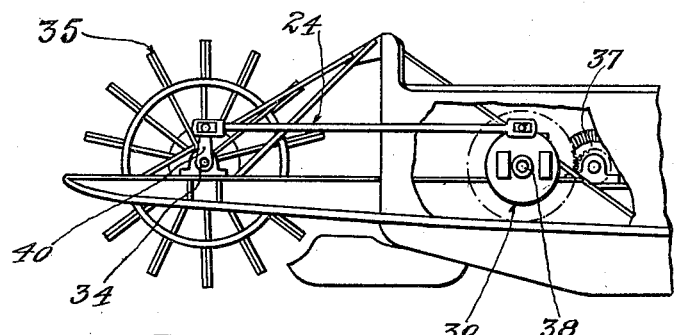
Fig. 3 is a fragmentary view of a stern-wheel boat provided with cranks of my invention.

In Figs. 3 and 4 is also shown a driving mechanism commonly used on boats operated by Diesel engines or Diesel electric drives. This mechanism comprises the line shaft 36 directly connected to the boat engine (not shown), the power of which is transmitted to the stern-wheel shaft 34 by a set of bevel and spur gears 37, the drive shaft 38, the sliding crank units 39, the pitmen 24 and the rigid cranks 40 mounted on the stern-wheel shaft. The location of the sliding and rigid cranks could be reversed, but I prefer to place the heavier sliding crank on the drive shaft which is mounted on the hull of the boat, thus reducing the overhanging weight at the stern.

While I have illustrated and described herein the preferred embodiment of my invention, and one which I have found by actual test to be highly efficient and practical, it may be found desirable after continued experience to make slight changes in the construction and arrangement of the details of my invention, and I intend to include in this application all such variations as fall within the scope of the appended claims.

I claim:

1. In a crank, the combination of a housing; a cover therefore; a crank-pin support positioned therein; a pair of spaced lugs positioned on said support symmetrically on each side of the radial axis thereof; spring means positioned between said pairs of lugs and restrained thereby to an initial compression the total magnitude of which corresponds to the normal driving force which the crank-pin is intended to carry; spring-cups having extensions at each end of each spring means passing through said lugs and bearing against suitable parts of the housing, and means for guiding the support for linear motion in a line parallel to the radial axis of the crank; the combination being arranged so that when a force in excess of the initial compressive load in the springs is applied in a line parallel to the axis of the crank the springs will be compressed and the crank-pin support moved in the axial line and so that a force applied in a line perpendicular to the axis of the crank does not compress the springs and produce movement of the crank-pin support.

2. In a crank, the combination of a housing secured on a crank-shaft; a cover for the housing, a crank-pin-support positioned in the housing; means for guiding said support for linear motion along the radial line of the crank; springs mounted symmetrically on each side of the radial axis of the crank; a set of lugs positioned in spaced relation on said support each adapted to receive therebetween said springs; spring-cups positioned at both ends of each spring; stems positioned on said cups and guided by said lugs, and abutments positioned on the housing for said stems; said springs being subjected to an initial compression capable of carrying collectively without deflection the power normally transmitted by the crank.

3. In a crank, the combination of a housing secured on a crank-shaft; a cover for the housing a crank-pin-support positioned in the housing and comprising a central body portion, a crank-pin arm and a guide-arm arranged in diametrally opposite relation; means supported in the housing and engaging said arms for guiding the crank-pin-support for linear motion along the axis of the arms; a set of lugs positioned in spaced relation and symmetrically on each side of the axis of the crank-pin-support; spring-cups positioned on the lugs; abutments for said cups positioned on the housing, and springs supported at the ends by said cups; said springs being subjected to an initial compression capable of carrying collectively without deflection the power normally transmitted by the crank.

4. In a crank, the combination of a substantially cylindrical housing; an inwardly directed hub therefor adapted to be engaged by the crank-shaft; a cover for the housing; a sleeve thereon in close outward engagement with the hub; a crank-pin-support positioned in the housing and comprising a central body portion having a central aperture freely engaged by said sleeve; a crank-pin arm and a guide-arm arranged in diametrally opposed relation; means supported in the housing and engaging said arms for guiding the crank-pin-support for linear motion along the axis of the arms; a set of lugs positioned in spaced relation and symmetrically on each side of the axis of the crank-pin-support; spring-cups positioned on the lugs; abutments for said cups positioned on the housing, and springs supported at the ends by said cups; said springs being subjected to an initial compression capable of carrying collectively without deflection the power transmitted normally by the crank.

5. In a crank, the combination of a housing secured to a crank-shaft; a cover therefor; a crank-pin-support positioned in the housing; means for guiding said support for linear motion along the radial line of the crank; means to limit said linear motion; springs mounted symmetrically on each side of the radial axis of the crank; a set of lugs positioned in spaced relation on said support each adapted to receive therebetween said springs; spring-cups positioned at both ends of said springs; stems positioned on said cups and guided by said lugs, and abutments positioned on the housing for said stems; said springs being subjected to an initial compression capable of carrying collectively without deflection the torque normally transmitted by the crank.

In testimony whereof I affix my signature.

CHARLES McC. WELLONS.